United States Patent
Buytaert et al.

(10) Patent No.: US 10,358,769 B2
(45) Date of Patent: Jul. 23, 2019

(54) TERNARY OR QUATERNARY ALLOY COATING FOR STEAM AGEING AND CURED HUMIDITY ADHESION ELONGATED STEEL ELEMENT COMPRISING A TERNARY OR QUATERNARY BRASS ALLOY COATING AND CORRESPONDING METHOD

(75) Inventors: Guy Buytaert, Sint-Gillis-Waas (BE); Dieter Wemel, Ghent (BE); Patricia Reis, Vespasiano (BR)

(73) Assignee: NV BEKAERT SA, Zwevegem (BE)

( * ) Notice: Subject to any disclaimer, the term of this patent is extended or adjusted under 35 U.S.C. 154(b) by 793 days.

(21) Appl. No.: 14/375,567

(22) PCT Filed: Jul. 24, 2012

(86) PCT No.: PCT/EP2012/064477
§ 371 (c)(1),
(2), (4) Date: Jul. 30, 2014

(87) PCT Pub. No.: WO2013/117249
PCT Pub. Date: Aug. 15, 2013

(65) Prior Publication Data
US 2015/0017467 A1    Jan. 15, 2015

(30) Foreign Application Priority Data
Feb. 6, 2012  (EP) .................... 12154052

(51) Int. Cl.
| | |
|---|---|
| *D07B 1/06* | (2006.01) |
| *B21C 9/02* | (2006.01) |
| *C10M 173/02* | (2006.01) |
| *C22C 9/04* | (2006.01) |
| *C22C 38/00* | (2006.01) |
| *C22C 38/02* | (2006.01) |
| *C22C 38/04* | (2006.01) |
| *C22C 38/42* | (2006.01) |
| *C22C 38/44* | (2006.01) |
| *C25D 5/10* | (2006.01) |

(Continued)

(52) U.S. Cl.
CPC .............. *D07B 1/0666* (2013.01); *B21C 9/02* (2013.01); *C10M 173/00* (2013.01); *C10M 173/02* (2013.01); *C22C 9/04* (2013.01); *C22C 38/00* (2013.01); *C22C 38/001* (2013.01); *C22C 38/02* (2013.01); *C22C 38/04* (2013.01); *C22C 38/42* (2013.01); *C22C 38/44* (2013.01); *C25D 5/10* (2013.01); *C25D 5/48* (2013.01); *C25D 5/50* (2013.01); *C25D 7/0607* (2013.01); *D07B 1/0633* (2013.01); *D07B 1/0646* (2013.01); *C10M 2203/10* (2013.01); *C10M 2203/1006* (2013.01); *C10M 2207/125* (2013.01); *C10M 2207/401* (2013.01); *C10M 2215/202* (2013.01); *C10M 2215/223* (2013.01); *C10M 2219/042* (2013.01); *C10M 2223/04* (2013.01); *C10N 2240/402* (2013.01); *C25D 3/12* (2013.01); *C25D 3/22* (2013.01); *C25D 3/38* (2013.01); *D07B 1/066* (2013.01); *D07B 2201/2011* (2013.01); *D07B 2201/2012* (2013.01); *D07B 2201/2013* (2013.01); *D07B 2201/2043* (2013.01); *D07B 2201/2044* (2013.01); *D07B 2201/2045* (2013.01); *D07B 2205/3089* (2013.01); *Y10T 428/12562* (2015.01); *Y10T 428/12924* (2015.01)

(58) Field of Classification Search
None
See application file for complete search history.

(56) References Cited

U.S. PATENT DOCUMENTS

| | | |
|---|---|---|
| 2,240,805 A | 5/1941 | Semon |
| 2,500,810 A | 3/1950 | Fink |

(Continued)

FOREIGN PATENT DOCUMENTS

| | | |
|---|---|---|
| EP | 0 175 632 A1 | 3/1986 |
| EP | 0 257 667 A1 | 3/1988 |

(Continued)

OTHER PUBLICATIONS

Amendment and Reply Under 37 C.F.R. 1.116 in U.S. Appl. No. 14/375,295, submitted Nov. 20, 2017 (Year: 2017).*

(Continued)

*Primary Examiner* — Daniel J. Schleis
(74) *Attorney, Agent, or Firm* — Foley & Lardner LLP

(57) ABSTRACT

An elongated steel element adapted for the reinforcement of rubber products is covered with a ternary alloy or quaternary alloy coating of copper-M-zinc. M is one or two metals selected out of the group consisting of cobalt, nickel, tin, indium, manganese, iron, bismuth and molybdenum. The copper content inside the coating ranges from 58 weight percent to 75 weight per cent. The content of the one or two metals inside said coating ranges from 0.5 weight percent to 10 weight percent. The remainder is zinc and unavoidable impurities. The one or two metals are present throughout the coating. Phosphorus is present on and/or in the coating in an amount of more than 1 and less than 4 milligram per square meter of the coating. The coating further comprises one or, ore compounds which complex with the copper in the coating to form an insoluble film on its surface. Good results are obtained for steam ageing and cured humidity adhesion. Furthermore, a corresponding method for manufacturing such an elongated steel element is disclosed.

22 Claims, No Drawings

(51) Int. Cl.
    *C25D 5/48*          (2006.01)
    *C25D 5/50*          (2006.01)
    *C25D 7/06*          (2006.01)
    *C10M 173/00*       (2006.01)
    C25D 3/12          (2006.01)
    C25D 3/22          (2006.01)
    C25D 3/38          (2006.01)

(56) References Cited

U.S. PATENT DOCUMENTS

| | | | |
|---|---|---|---|
| 2,792,868 A | 5/1957 | Benson | |
| 3,391,531 A | 7/1968 | Riggs | |
| 3,846,160 A * | 11/1974 | Hirakawa Hiroshi | C08J 5/06 427/388.2 |
| 3,961,740 A | 6/1976 | Nakamoto et al. | |
| 4,189,332 A * | 2/1980 | Rye | C23C 8/10 148/282 |
| 4,255,496 A * | 3/1981 | Haemers | C23C 30/00 152/565 |
| 4,265,678 A * | 5/1981 | Hachisuka | B21C 37/042 148/517 |
| 4,269,645 A * | 5/1981 | Shemenski, Sr. | C08J 5/06 148/274 |
| 4,269,877 A * | 5/1981 | Shemenski, Sr. | C08J 5/06 148/268 |
| 4,283,460 A * | 8/1981 | Shemenski, Sr. | C08J 5/06 148/274 |
| 4,347,290 A | 8/1982 | Haemers | |
| 4,446,198 A * | 5/1984 | Shemenski | B32B 15/015 152/565 |
| 4,488,587 A | 12/1984 | Umezawa et al. | |
| 4,521,558 A * | 6/1985 | Mowdood | C08F 279/02 524/145 |
| 4,543,298 A | 9/1985 | Riedl | |
| 4,545,834 A | 10/1985 | Shemenski et al. | |
| 4,572,264 A | 2/1986 | Umezawa et al. | |
| 4,651,513 A | 3/1987 | Dambre | |
| 4,704,337 A * | 11/1987 | Coppens | C08J 5/06 152/451 |
| 4,765,917 A | 8/1988 | Otaki et al. | |
| 4,788,815 A | 12/1988 | Umezawa | |
| 4,883,722 A * | 11/1989 | Coppens | C08J 5/06 428/625 |
| 5,050,657 A | 9/1991 | Umezawa | |
| 5,118,367 A * | 6/1992 | Starinshak | C23C 22/12 148/262 |
| 5,321,941 A | 6/1994 | Bollen et al. | |
| 5,323,596 A | 6/1994 | Nguyen | |
| 5,498,351 A | 3/1996 | Hefling | |
| 5,526,864 A | 6/1996 | Kuriya et al. | |
| 5,687,557 A | 11/1997 | De Vos et al. | |
| 5,697,204 A | 12/1997 | Kuriya | |
| 5,843,583 A | 12/1998 | D'Haene et al. | |
| 5,878,564 A | 3/1999 | De Vos et al. | |
| 6,068,918 A * | 5/2000 | Van Der Veer | C10M 133/44 428/379 |
| 6,150,308 A | 11/2000 | Deruyck et al. | |
| 6,203,932 B1 * | 3/2001 | Hisakatu | B21C 1/00 152/556 |
| 6,691,758 B2 | 2/2004 | Kim et al. | |
| 6,811,877 B2 | 11/2004 | Haislet et al. | |
| 6,863,103 B1 | 3/2005 | Masubuchi et al. | |
| 7,089,723 B2 | 8/2006 | Vanneste et al. | |
| 7,152,391 B2 | 12/2006 | Vanneste et al. | |
| 7,162,902 B2 * | 1/2007 | Oosawa | B60C 9/0007 72/274 |
| 7,300,685 B2 * | 11/2007 | Acx | C23C 2/04 29/527.2 |
| 7,963,093 B2 | 6/2011 | Vanderbeken et al. | |
| 8,863,490 B2 | 10/2014 | Boisseau et al. | |
| 8,899,007 B2 | 12/2014 | Cheng et al. | |
| 2002/0103089 A1 | 8/2002 | Fukushima et al. | |
| 2005/0051251 A1 | 3/2005 | Sinopoli et al. | |
| 2006/0237110 A1 | 10/2006 | Barguet et al. | |
| 2010/0170215 A1 | 7/2010 | Nishimura | |
| 2012/0177944 A1 | 7/2012 | Toyosawa | |
| 2014/0196810 A1 * | 7/2014 | Glejbol | F16L 11/083 138/137 |
| 2014/0378597 A1 | 12/2014 | Buytaert et al. | |
| 2015/0017467 A1 | 1/2015 | Buytaert et al. | |

FOREIGN PATENT DOCUMENTS

| | | |
|---|---|---|
| EP | 0 314 230 A1 | 5/1989 |
| EP | 0 382 273 A1 | 8/1990 |
| EP | 1 067 236 A2 | 1/2001 |
| EP | 2 268 839 | 9/2009 |
| GB | 1 466 114 A | 3/1977 |
| GB | 2 076 320 A | 12/1981 |
| JP | 55-071887 A | 5/1980 |
| JP | 56-082604 A | 7/1981 |
| JP | 56-96977 A | 8/1981 |
| JP | 62-288634 A | 12/1987 |
| JP | 01-113232 A | 5/1989 |
| JP | 01-113234 A | 5/1989 |
| JP | 01-295842 A | 11/1989 |
| JP | 02-036241 A | 2/1990 |
| JP | 6-49783 A | 2/1994 |
| JP | H0649783 * | 2/1994 |
| JP | 2001-234371 A | 8/2001 |
| JP | 2005-246447 A | 9/2005 |
| JP | 2006-028651 A | 2/2006 |
| JP | 2010-280928 A | 12/2010 |
| JP | 2011-147994 A | 8/2011 |
| JP | 2011147994 * | 8/2011 |
| JP | 2011-219837 A | 11/2011 |
| JP | 2012-12625 A | 1/2012 |
| WO | WO 2011/076746 A1 | 6/2011 |

OTHER PUBLICATIONS

Anonymous, High Durable Steel Cord Reinforced Rubber Tire, Research Disclosure, vol. 274, No. 36, Feb. 1, 1987, 2 pages, Mason Publications, Hampshire, GB.

W. J, Van Ooij, Mechanism and Theories of Rubber Adhesion to Steel Tire Cords—An Overview, Rubber Chemistry and Technology, Jan. 1, 1984, pp. 421-456, vol. 57.

Letter of Douglas Holtz of Jul. 16, 2015 (2 pages).

Sebastien Hollinger et al., Wear Mechanism of Tungsten carbide dies during wet drawing of Steel Tyre Cords, WEAR, vol. 255, No. 7-12, Aug. 1, 2003, pp. 1291-1299.

U.S. Appl. No. 14/375,295, filed Jul. 29, 2014, Buytaert et al.

USPTO Office Action, U.S. Appl. No. 14/375,295, dated Feb. 23, 2017, 9 pages.

Annonymous: "Micro-alloyed steel cord constructions for tyres", Mason Publications, vol. 349, No. 84, (May 1, 1993) 25 pgs.

USPTO Office Action, U.S. Appl. No. 14/375,295, dated May 30, 2017, 21 pages.

USPTO Office Action, U.S. Appl. No. 14/416,769, dated May 19, 2017, 16 pages.

USPTO Office Action, U.S. Appl. No. 14/375,295, dated Sep. 19, 2017, 20 pages.

USPTO Office Action, U.S. Appl. No. 14/416,769, dated Sep. 28, 2017, 12 pages.

USPTO Advisory Action, U.S. Appl. No. 14/375,295, dated Dec. 6, 2017, 9 pages.

USPTO Notice of Allowance, U.S. Appl. No. 14/416,769, dated Dec. 18, 2017, 9 pages.

Japanese Office Action and English translation, Application No. 2015-523462, dated Aug. 4, 2017, 12 pages.

USPTO Office Action, U.S. Appl. No. 14/375,295, dated Jan. 18, 2018, 29 pages.

"Internationally Agreed Methods for Testing Steel Tyre Cords," BISFA The International Bureau for the Standardisation of Man-Made Fibres, 1995, 4 pages.

"Non-parallel Steel Wire and Cords for Tyre Reinforcement," International Standard (ISO) 17832, Jul. 1, 2009, First Edition, 18 pages.

(56) References Cited

OTHER PUBLICATIONS

"Project Sodetal Advanced Wire Technologies; General Overview," Sodetal Advanced Wire Technologies (AWT), Aug. 2014, vol. 1, 3 pages.
"Steel Cord Catalogue," N.V. Bekaert S.A., Feb. 1987, pp. 8, 12, and 22-25.
Hyosung Product Index (2011), Retrieved from http://pi.hyosung.com/pi_eng/car/steelcord/steelcord_01.do, 10 pages.
Trade House BMZ (2016), "Product Catalogue," Retrieved from http://www.bmzm.ru/en/prod_type.php?t=4, 17 pages.

* cited by examiner

TERNARY OR QUATERNARY ALLOY COATING FOR STEAM AGEING AND CURED HUMIDITY ADHESION ELONGATED STEEL ELEMENT COMPRISING A TERNARY OR QUATERNARY BRASS ALLOY COATING AND CORRESPONDING METHOD

TECHNICAL FIELD

The present invention relates to an elongated steel element adapted for the reinforcement of rubber products. The present invention also relates to a process for manufacturing such an elongated steel element.

BACKGROUND ART

Elongated steel elements such as brass coated steel wires and steel cords are widely used to reinforce rubber products such as tires. In order to have a good adhesion formation and to reduce the rate of degradation of adhesion, particularly due to ageing in hot humid conditions, cobalt complexes are added to the rubber compound. However, cobalt is considered to be a poison for the rubber since, like most transition metals, it is an oxidation catalyst. As a result, oxidation of diene rubber molecules is accelerated, which leads to early rubber ageing. Moreover, cobalt also speeds up crack growth rate of the rubber.

In addition to the above disadvantage there is also the following problem: Cobalt is a strategic material and it is quite expensive. By adding cobalt to the whole rubber compound, one adds too much cobalt since it has only a positive function at the brass surface. Generally, it is considered that only 20% of the cobalt added to the rubber is used effectively.

The prior art has already recognized one or more of these problems. A lot of attempts have been made to concentrate the cobalt there where it belongs, namely in or on the coating of the steel wires or steel cords.

Yet in 1936 there was an attempt to completely replace the brass coating by a pure cobalt coating on articles for reinforcing rubber (U.S. Pat. No. 2,240,805).

U.S. Pat. No. 4,255,496 (Bekaert) discloses the use of a ternary alloy copper-cobalt-zinc coating instead of a binary alloy copper-zinc (=brass) coating. With this ternary alloy, the rate of bond degradation due to aging in hot humid conditions can be significantly reduced.

U.S. Pat. No. 4,265,678 (Tokyo Rope) teaches the use of a ternary alloy copper-zinc-cobalt coating with excellent drawability and adhesion properties.

GB-A-2 076 320 (Sodétal) teaches a thin layer of cobalt on top of a brass coating followed by a wire drawing so that there is a high gradient of cobalt on top of the brass coating.

EP-A1-0 175 632 (Goodyear) teaches a quaternary alloy coating copper-zinc-nickel-cobalt on steel elements.

Finally, WO-A1-2011/076746 discloses a steel cord with a ternary or quaternary alloy coating and with a zinc gradient. Although giving improvement with respect to adhesion, this zinc gradient involves a post-treatment of the wire or cord, meaning an extra operation step in the process.

DISCLOSURE OF INVENTION

It is an object of the present invention to avoid the drawbacks of the prior art.

It is also an object of the present invention to stir the adhesion performance of ternary alloy or quaternary alloy coated elongated steel elements, particularly after steam and cured humidity ageing.

It is yet another object of the present invention to avoid from using extra operation steps in the manufacturing process.

According to a first aspect of the present invention, there is provided an elongated steel element adapted for the reinforcement of rubber products. This elongated steel element is covered with a ternary or quaternary alloy of copper-M-zinc coating.

M is one or two metals selected out of the group consisting of cobalt, nickel, tin, indium, manganese, iron, bismuth and molybdenum.

The copper content inside this coating ranges from 58 weight percent to 75 weight percent, e.g. from 61 wt % to 70 wt %.

The content of the one or two metals inside the coating ranges from 0.5 weight percent to 10 weight percent, e.g. 2 wt % to 8 wt %. The one or two metals are present throughout the coating, and are not only present at the immediate surface.

The remainder is zinc and unavoidable impurities, e.g. impurities in quantities lower than 0.1 wt %.

The thickness of the coating ranges from 0.05 μm to 0.50 μm, e.g. from 0.12 μm to 0.40 μm.

The weight percentages of copper, the one or two metals, and the balance of zinc may be measured by an analytical dissolution technique and with X-ray fluorescence (XRFS), Inductively Coupled Plasma (ICP) or Atomic Absorption Spectroscopy (AAS). These measurements are also suitable to obtain the coating weight and the coating thickness.

Phosphorus is present on the coating in an amount of more than 1 milligram per square meter of the coating. Preferably this amount is limited to 4 milligram per square meter, e.g. limited to 3 milligram per square meter. This phosphorus amount may be present in the form of inorganic or organic phosphorus such as phosphates. The phosphorus amount may be measured by means of an Inductively Coupled Plasma technique or by means of an ultraviolet-visible spectroscopy. The coating or the surface of the coating is further having residues of compounds that complex with the copper in the coating to form an insoluble film. These compounds include triazoles, imidazoles and indazoles. Such compounds include those having the following structural formula:

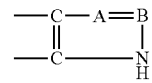

where the adjacent carbon atoms are joined to form a benzene or naphthylene ring, said ring being substituted or unsubstituted and wherein A and B are selected from a group consisting of —N— or —CH—, with A and B never being simultaneously equal to —CH—. Examples of such compounds are benzotriazole, tolyltriazole, benzimidazole, indazole, naphthatriazole. The presence or residues of one or more of these compounds may be measured by a Time of Flight—Secondary Ion Mass Spectrometery (ToF-SIMS) technique.

This technique provides information on the atomic and molecular composition of the uppermost 1-3 monolayers with sensitivities at ppm level and lateral resolutions down to 100 nm.

ToF-SIMS is not an inherently quantitative technique because the detected intensities depend on the chemical composition of the ambient material ("matrix effect"). Semi-quantitative information can be obtained if the chemical environment of the samples to be compared is similar.

In spectrometry mode a total mass spectrum of a surface region of interest is acquired. These spectra are usually recorded with high mass resolution and a low number of used primary ions. The high mass resolution is necessary for a reliable identification of secondary ion signals and corresponding sum formulas. The limited number of primary ions guarantees that the detected signals are representative for the original chemical composition of the sample surface (Static SIMS limit).

For the ToF-SIMS measurements of the present invention, an ION-TOF "TOF-SIMS IV" SIMS instrument was used. Ion bombardment of the surface was performed using bismuth ions at 25 keV in a bunched mode. Analysis current is 0.2 pA and the analysed area is $100 \times 100$ μm$^2$.

The elongated steel element may be a steel wire or a steel cord. In case of a steel cord, the invention is not limited to a particular type of construction.

The terms "adapted for the reinforcement of rubber products" refer to steel wires and steel cords with a suitable wire or filament diameter, a suitable steel composition and a suitable tensile strength.

A suitable steel composition is e.g. a minimum carbon content of 0.65%, a manganese content ranging from 0.10% to 0.70%, a silicon content ranging from 0.05% to 0.50%, a maximum sulphur content of 0.03%, a maximum phosphorus content of 0.03%, even of 0.02%, all percentages being percentages by weight. There are only traces of copper, nickel and/or chromium. The remainder is always iron.

Micro-alloyed steel compositions may also be suitable such as compositions further comprising one or more of following elements:
  chromium (% Cr): in amounts ranging from 0.10% to 1.0%, e.g. from 0.10 to 0.50%;
  nickel (% Ni): in amounts ranging from 0.05% to 2.0%, e.g. from 0.10% to 0.60%;
  cobalt (% Co): in amounts ranging from 0.05% to 3.0%; e.g. from 0.10% to 0.60%;
  vanadium (% V): in amounts ranging from 0.05% to 1.0%, e.g. from 0.05% to 0.30%;
  molybdenum (% Mo): in amounts ranging from 0.05% to 0.60%, e.g. from 0.10% to 0.30%;
  copper (% Cu): in amounts ranging from 0.10% to 0.40%, e.g. from 0.15% to 0.30%;
  boron (% B): in amounts ranging from 0.001% to 0.010%, e.g. from 0.002% to 0.006%;
  niobium (% Nb): in amounts ranging from 0.001% to 0.50%, e.g. from 0.02% to 0.05%;
  titanium (% Ti): in amounts ranging from 0.001% to 0.50%, e.g. from 0.001% to 0.010%;
  antimony (% Sb): in amounts ranging from 0.0005% to 0.08%, e.g. from 0.0005% to 0.05%;
  calcium (% Ca): in amounts ranging from 0.001% to 0.05%, e.g. from 0.0001% to 0.01%;
  tungsten (% W): e.g. in an amount of about 0.20%;
  zirconium (% Zr): e.g. in an amount ranging from 0.01% to 0.10%;
  aluminum (% Al): preferably in amounts lower than 0.035%, e.g. lower than 0.015%, e.g. lower than 0.005%;
  nitrogen (% N): in amounts less than 0.005%;
  rare earth metals (% REM): in amounts ranging from 0.010% to 0.050%.

Within the context of the present invention low-carbon steel compositions such as disclosed in EP-A-2 268 839 are not excluded. Such a steel compositions has a carbon content of less than 0.20%. An example is a carbon content ranging between 0.04% and 0.08%, a silicon content of 0.166%, a chromium content of 0.042%, a copper content of 0.173%, a manganese content of 0.382%, a molybdenum content of 0.013%, a nitrogen content of 0.006%, a nickel content of 0.077%, a phosphorus content of 0.007%, a sulphur content of 0.013%, all percentages being percentages by weight.

The diameter of individual steel wires or steel filaments of elongated steel elements adapted for reinforcement of rubber products usually ranges from 0.03 mm to 1.20 mm, e.g. from 0.10 mm to 0.80 mm, e.g. from 0.15 mm to 0.60 mm.

The levels of roughness $R_a$ measured on the individual steel wires vary from 0.10 μm to 2.0 μm, e.g. from 0.10 μm to 1.0 μm, e.g. from 0.10 μm to 0.30 μm.

The tensile strength of elongated steel elements adapted for the reinforcement of rubber products largely depends upon the diameter and usually ranges from 1500 MPa to 4500 MPa, e.g. from 2000 MPa to 4000 MPa.

As will be explained hereinafter, the amounts of phosphorus on the coating together with the presence of triazole residues lead to improved adhesion results after cured humidity (CH) and after steam ageing (SA). Cured humidity (CH) is when samples of regular cure (RC) are held at a temperature in a range from 70° C. to 93° C. in a 95% relative humidity environment for three, seven, or fourteen or even more days. Steam ageing (SA) is when samples of regular cure (RC) are steam cooked at a temperature in a range from 105° C. to 121° C. for a few hours until one or two days. Regular cure (RC) is TC90 time plus five minutes. TC90 is the time where the rubber reaches 90% of its maximum torque on a rheometer curve taken at vulcanisation temperature. With amounts of phosphorus below 1 mg/m$^2$, lower adhesion performance is noticed.

Both the phosphates at the surface and the triazole residues on the surface passivate the brass alloy coating to a little extent. Hence, they slow down the adhesion build-up, as adhesion build-up is an oxy-sulfidation reaction of copper and zinc. They also slow down adhesion degradation in hot and humid environment, via a slowdown of the dezincification mechanism.

EP-A1-0 257 667 discloses a brass alloy coating for steel elements for rubber reinforcement, where the brass alloy coating contains small amounts of phosphorus. The phosphorus is described as improving the adhesion between the rubber and the brass. However, the amount of phosphorus is higher than in the present invention and neither the presence nor the effect of triazoles are mentioned in EP-A1-0 257 667.

According to a second aspect of the present invention, there is provided process for manufacturing an elongated steel element. This process comprising the following steps:
a) coating an elongated steel element with a ternary or quaternary alloy of copper-M-zinc coating, where M is one or two metals selected out of the group consisting of cobalt, nickel, tin, indium, manganese, iron, bismuth and molybdenum, the copper content inside said coating ranges from 58 weight percent to 75 weight percent, the content of the one or two metals inside the coating ranges from 0.5 weight percent to 10 weight percent, the remainder is zinc and unavoidable impurities; the one or two metals being present throughout said coating;
b) drawing the thus coated elongated steel element in an aqueous lubricant containing a phosphorus compound, the amount of phosphorus compound being such that phosphorus is present on the coating in an amount of more than 1 milligram per square meter of the coating.

The aqueous lubricant may be an emulsion or a dispersion.

The phosphorus amount is preferably less than 4 milligram per square meter, e.g. less than 3.5 milligram per square meter, e.g. less than 3.0 milligram per square meter. The reason is that too high phosphorus amounts may have a negative effect on initial adhesion.

The phosphorus amount is measured by means of an Inductively Coupled Plasma technique.

The lubricant further has one or more compounds that complex with the copper in the coating to form an insoluble film. These compounds include triazoles, imidazoles and indazoles.

As mentioned, the amounts of phosphorus and the triazole compounds lead to an improved adhesion behaviour both after cured humidity and after steam ageing. Since the phosphorus and the triazole compounds are added to the ternary or quaternary alloy coating by means of the wet wire drawing lubricant, no additional process step is required to achieve this improved adhesion.

The invention also relates to a rubber product reinforced with an elongated steel element with the features as disclosed here above.

MODE(S) FOR CARRYING OUT THE INVENTION

Two sample steel wires with a diameter of 1.98 mm are provided with a ternary alloy coating as follows:
i) pickling in a $H_2SO_4$ solution to clean the surface of the steel wire;
ii) electroplating with copper from a $Cu_2P_2O_7$ solution; solution contains 25 g/l copper and 180 g/l pyrophosphate; current density is 8.6 A/dm² or higher for higher copper content;
iii) electroplating cobalt from a $CoSO_4$ solution; solution contains 40 g/l cobalt and current density is 22 A/dm²;
iv) electroplating with zinc from a $ZnSO_4$ solution; solution contains 50 g/l zinc and current density is 8.8 A/dm² or lower for lower zinc content;
v) applying a thermal diffusion process to create the ternary alloy Cu—Co—Zn;
vi) removing excess of ZnO formed during diffusion process via a dip in an acid;
vii) rinsing and drying.

Steel wire 1 has following coating composition: 63.5 wt % Cu, 4.0 wt % Co, the remainder being Zn.

Steel wire 2 has following coating composition: 67.0 wt % Cu, 4.0 wt % Co, the remainder being Zn.

A third sample steel wire is provided without the ternary alloy coating, but with the more common brass coating copper-zinc. Steel wire 3 has following coating composition: about 64 wt % Cu, the remainder being Zn.

The steel wires are subjected to a final reduction in diameter during a wet wire drawing operation.

Three different lubricants are used: R-I1-I2.

Reference lubricant R is an aqueous emulsion containing more than 90% water, an oil, surfactant, soap, phosphorus compound and a pH buffering system. The pH is also partially buffered by working of amines.

More particularly, lubricant R comprises phosphates, sulphates, nitrates, O-containing hydrocarbons and fatty acid residues, N-containing hydrocarbons. The phosphates may be present as $PO_2$- or as $PO_3$-ions.

Lubricants I1 and I2 are lubricants used in the context of the present invention.

Invention lubricant I1 is an aqueous emulsion containing mineral oil, surfactant, soap, phosphorus compound, extreme pressure additive, corrosion inhibitor of the triazole type, e.g. benzotriazole, and a pH buffering system. The pH is also partially buffered by working of amines. More particularly, lubricant I1 contains phosphates, CN/CNO, benzotriazole, hydrocarbons, fatty acids and octylphosphate acid.

Invention lubricant I2 is an aqueous emulsion containing vegetable oil, surfactant, soap, phosphorus compound, extreme pressure additive, corrosion inhibitor of the triazole type, e.g. benzotriazole, and a pH buffering system. The pH is also partially buffered by working of amines. More particularly, lubricant I2 contains phosphates, CN/CNO, benzotriazole, hydrocarbons, fatty acids and octylphosphate acid.

Final steel wire diameter is 0.30 mm. After wet wire drawing the steel wires have been twisted into a 2×0.30 steel cord construction.

Combining the three steel wires 1 and 2 and 3 with the three lubricants R, I1 and I2, gives nine different steel cord samples 1-R, 1-I1, 1-I2, 2-R, 2-I1, 2-I2, 3-R, 3-I1 and 3-I2. These nine different steel samples have been vulcanized in a rubber compound. The pull-out force (POF) and the appearance ratio (APR) or rubber coverage have been measured on these samples.

Table 1 lists, amongst others, the amount of phosphorus on the surface of the ternary alloy coating.

TABLE 1

| Sample | Lube | Cu (wt %) | Co (wt %) | Thickness coating (µm) | $P_s$ (mg/m²) |
|---|---|---|---|---|---|
| 1-R ref | R | 64.00 | 3.7 | 0.26 | 0.85 |
| 1-I1 inv | I1 | 64.50 | 3.6 | 0.25 | 1.15 |
| 1-I2 inv | I2 | 64.20 | 3.7 | 0.25 | 1.31 |
| 2-R ref | R | 67.60 | 3.5 | 0.26 | 0.75 |
| 2-I1 inv | I1 | 68.00 | 3.5 | 0.25 | 1.07 |
| 2-I2 inv | I2 | 68.13 | 3.5 | 0.25 | 1.24 |
| 3-R-ref | R | 63.95 | 0.0 | 0.25 | 0.81 |
| 3-I1-ref | I1 | 64.30 | 0.0 | 0.24 | 1.09 |
| 3-I2-ref | I2 | 64.20 | 0.0 | 0.25 | 1.28 | inv = invention
ref = reference
$P_s$ = amount of phosphorus

Table 2 mentions the results of the pull-out test (ASTM D2229) and of the appearance ratio test in regular cure (RC) and after steam ageing (SA) obtained in a cobalt-free rubber compound.

TABLE 2

| | POF (N) | | APR (%) | |
|---|---|---|---|---|
| Sample | RC | SA | RC | SA |
| 1-R ref | 421 | 359 | 85 | 83 |
| 1-I1 inv | 358 | 359 | 73 | 85 |
| 1-I2 inv | 424 | 359 | 80 | 90 |
| 2-R ref | 379 | 256 | 80 | 58 |
| 2-I1 inv | 415 | 324 | 83 | 68 |
| 2-I2 inv | 429 | 344 | 88 | 83 |
| 3-R-ref | 377 | 142 | 80 | 28 |
| 3-I1-ref | 387 | 197 | 78 | 43 |
| 3-I2-ref | 403 | 227 | 83 | 45 |

The invention samples 1-I1 inv, 1-I2 inv, 2-I1 inv and 2-I2-inv perform better both in -the pull-out test as in the appearance ratio test after steam ageing. The results on SA (steamed adhesion) of the invention samples 1-I1 inv, 1-I2 inv, 2-I1 inv and 2-I2-inv are remarkably better than those of the 3-R-ref, 3-I1-ref and 3-I2-ref samples with the normal brass coating, even in case for the normal brass coating the same lubricant and the same level of phosphorus amount on the surface are applied.

The adhesion behaviour of invention samples 1-I1 inv, 1-I2 inv, 2-I1 inv and 2-I2-inv at under cure (UC) are at an acceptable high level, see Table 3 hereafter.

Under cure (UC) is when the rubber is vulcanised for about half of the regular curing time.

TABLE 3

| sample | POF (UC) | APR (UC) |
|---|---|---|
| 1-I1 inv | 263 | 48 |
| 1-I2 inv | 223 | 33 |
| 2-I1 inv | 279 | 60 |
| 2-I2 inv | 255 | 50 |

Table 4 hereunder summarizes the results of a ToF-SIMS analysis carried on steel cord sample 2-I2-inv of the invention.

TABLE 4

| | Ion | File sample position mass (u) | Position 1 | Position 2 |
|---|---|---|---|---|
| Elements | F | 19 | 10.7 | 9.6 |
| | Si | 28 | 30.1 | 24.1 |
| | P | 31 | 12.6 | 8.6 |
| | S | 32 | 19.5 | 22.1 |
| | Cl | 35 | 497.1 | 443.2 |
| | $^{63}$Cu | 63 | 100.0 | 100.0 |
| Phosphates | $PO_2$ | 63 | 902.7 | 726.9 |
| | $PO_3$ | 79 | 1373.6 | 1118.3 |
| | $CuHPO_3$ | 143 | 207.2 | 155.5 |
| | $Cu(PO_3)_2$ | 221 | 205.0 | 127.5 |
| CN/CNO | CN | 26 | 910.0 | 814.6 |
| | CNO | 42 | 565.9 | 575.2 |
| | CuCHN | 90 | 187.3 | 187.8 |
| | CuCHNO | 106 | 340.9 | 342.2 |
| Triazole | $C_6H_4N$ | 90 | 120.8 | 111.2 |
| | $C_6H_4N_3$ | 118 | 244.7 | 223.9 |
| | $CuCNC_6H_4N_3$ | 207 | 53.7 | 55.4 |
| | $Cu(C_6H_4N_3)_2$ | 299 | 16.4 | 14.2 |
| Hydrocarbons | $C_2H$ | 25 | 1159.8 | 1222.2 |
| | $C_3H_2$ | 38 | 203.7 | 186.5 |
| Fatty Acids | $C_{16}H_{31}O_2$ | 255 | 48.5 | 23.6 |
| | $C_{18}H_{33}O_2$ | 281 | 58.6 | 44.1 |
| Octylphosph.Acid | $C_8H_{18}O_3P$ | 193 | 2.1 | 2.2 |
| Other | 261 | 261 | 65.8 | 65.7 |
| | 277 | 277 | 25.1 | 22.4 |

The amounts of benzotriazole found on or in the surface of the invention steel cord sample is clearly above the noise level of the ToF-SIMS analysis technique.

In comparison, the amounts of benzotriazole found on or in the surface of steel cord samples treated with reference lubricant R are ranging from 1.00 to 5.00, amounts which are considered noise level.

Table 5 hereunder mentions two possible tire rubber compound formulations together with its properties where an effective improvement on steam ageing and cured humidity adhesion have been noticed.

TABLE 5

| Ingredient | Compound 1 | Compound 2 |
|---|---|---|
| Natural rubber TSR10 | 100 parts | 100 parts |
| ZnO—Zinc oxide | 9 phr | 9 phr |
| Stearic acid | — | 0.7 phr |
| Carbon black HAFLS N326 | 65 phr | 65 phr |
| Anti-degradation compound 6PPD (*) | 1.8 phr | 1.8 phr |
| Sulphur source Crystex HSOT20 | 6.4 phr | 6.4 phr |
| Accelerator DCBS | 0.8 phr | — |
| Cobalt salt Manobond 680C | 0.27 phr | — |
| Accelerator TBBS | — | 0.7 phr |
| Retarder PVI | — | 0.25 phr |
| Properties | | |
| Rheometer Cure at 150° C. | | |
| Tc2 (min) | 1.8 | 3.5 |
| Tc90 (min) | 12.0 | 13.0 |
| $M_H$ (dNm) | 31.5 | 30.6 |
| Mooney at 100° C. | | |
| Viscosity (MU) | 66 | 70 |
| Shore A Hardness | 70 | 66 |
| Breaking load (N) | 336 | 337 |
| Tensile strength (MPa) | 22.5 | 23.0 |
| Modulus 100% (N/cm$^2$) | 4.7 | 4.7 |
| Modulus 200% (N/cm$^2$) | 10.3 | 11.1 |
| Modulus 300% (N/cm$^2$) | 16.3 | 17.9 |
| Elongation at break (%) | 421 | 396 |
| DMTA AT 60° C. 10 Hz dynamic strain | | |
| E' (MPa) | 12.61 | 8.58 |
| E"(MPa) | 1.98 | 0.94 |
| Tan δ(—) | 0.157 | 0.109 |

DMTA = dynamic mechanical thermal analysis
Tan δ at 60° C. is an indication for the rolling resistance, the lower the value the lower the rolling resistance.

Next to the ternary alloy compositions mentioned in Table 1, following compositions have also been tested:

| % Cu | % Co |
|---|---|
| 67 | 4 |
| 67 | 2 |
| 63 | 4 |
| 70 | 2 |
| 70 | 4 |
| 67 | 6 |
| 63.5 | 8 |
| 63.5 | 1 |

Due to an improved adhesion performance and better rubber compound an increased tire endurance may be noticed.

In addition, the absence of cobalt in the rubber compound reduces the rubber heat ageing.

Finally, a lower rolling resistance of about 2.5% to 4.0% or even higher may be noticed.

The invention claimed is:

1. An elongated steel element having a roughness $R_a$ ranging from 0.10 μm to 2.0 μm, and said elongated steel element being covered with a coating comprising a ternary alloy or quaternary alloy coating of copper-M-zinc,
    where M is one or two metals selected from the group consisting of cobalt, nickel, tin, indium, manganese, iron, bismuth and molybdenum,
    a copper content inside said coating ranging from 58 weight percent to 75 weight percent, a content of said one or two metals inside said coating ranging from 0.5 weight percent to 10 weight percent, a remainder being zinc and unavoidable impurities, said one or two metals being present throughout said coating, phosphorus being present on said coating in an amount of more than 1 milligram per square meter of said coating and less than 4 milligram per square meter of said coating, said phosphorus amount being measured via an Inductively Coupled Plasma technique, said coating further comprising residues of one or more compounds selected from the group of triazoles, imidazoles, and indazoles, as measured by a ToF-SIMS technique, and said elongated steel element is configured to reinforce tire rubber products.

2. The elongated steel element according to claim 1, the copper content ranging from 61 weight percent to 70 weight percent.

3. The elongated steel element according to claim 2, the content of said one or two metals ranging from 2 weight percent to 8 weight percent.

4. The elongated steel element according to claim 3, said elongated steel element being a steel wire or a steel cord.

5. A reinforced tire rubber article comprising a rubber compound and an elongated steel element, wherein said elongated steel element is the elongated steel element according to claim 4.

6. The elongated steel element according to claim 1, wherein the residues comprise benzotriazole.

7. The elongated steel element according to claim 1, wherein the residues comprise tolyltriazole.

8. The elongated steel element according to claim 1, wherein the residues comprise benzimidazole.

9. The elongated steel element according to claim 1, wherein the residues comprise indazole.

10. The elongated steel element according to claim 1, wherein the residues comprise naphthatriazole.

11. The elongated steel element according to claim 1, wherein a tensile strength of the elongated steel element ranges from 1500 MPa to 4500 MPa.

12. The elongated steel element according to claim 1, wherein the elongated steel element is comprised of individual steel wires or steel filaments having a diameter of 0.03 mm to 1.20 mm.

13. The elongated steel element according to claim 1, wherein a thickness of the coating is from 0.05 µm to 0.50 µm.

14. The elongated steel element according to claim 1, wherein the phosphorous is present on said coating in a form of inorganic phosphorous.

15. The elongated steel element according to claim 1, wherein the phosphorous is present on said coating in a form of organic phosphorous.

16. The elongated steel element according to claim 1, wherein the elongated steel element is comprised of individual steel wires or steel filaments having a diameter of 0.03 mm to 0.60 mm.

17. The elongated steel element according to claim 1, wherein the elongated steel element is comprised of individual steel wires or steel filaments having a diameter of 0.03 mm to 0.30 mm.

18. An elongated steel element comprising individual steel wires or steel filaments having a roughness $R_a$ ranging from 0.10 µm to 2.0 µm, and said elongated steel element being covered with a coating comprising a ternary alloy or quaternary alloy coating of copper-M-zinc, where M is one or two metals selected from the group consisting of cobalt, nickel, tin, indium, manganese, iron, bismuth and molybdenum, a copper content inside said coating ranging from 58 weight percent to 75 weight percent, a content of said one or two metals inside said coating ranging from 0.5 weight percent to 10 weight percent, a remainder being zinc and unavoidable impurities, said one or two metals being present throughout said coating, phosphorus being present on said coating in an amount of more than 1 milligram per square meter of said coating and less than 4 milligram per square meter of said coating, said phosphorus amount being measured via an Inductively Coupled Plasma technique, said coating further comprising residues of one or more compounds selected from the group of triazoles, imidazoles, and indazoles, as measured by a ToF-SIMS technique, and said elongated steel element is configured to reinforce tire rubber products.

19. A process for manufacturing an elongated steel element comprising the following steps:

a. coating an elongated steel element with a coating of a ternary alloy or a quaternary alloy of copper-M-zinc, where M is one or two metals selected from the group consisting of cobalt, nickel, tin, indium, manganese, iron, bismuth and molybdenum, a copper content inside said coating ranging from 58 weight percent to 75 weight percent, a content of said one or two metals inside said coating ranging from 0.5 weight percent to 10 weight percent, a remainder being zinc and unavoidable impurities, said one or two metals being present throughout said coating;

b. drawing said coated elongated steel element in an aqueous lubricant containing a phosphorus compound, an amount of phosphorus compound being such that phosphorus is present on said coating in an amount of greater than 1 milligram per square meter of said coating and smaller than 4 milligram per square meter of said coating, said phosphorus amount being measured via an Inductively Coupled Plasma technique, said lubricant further having one or more compounds selected from the group of triazoles, imidazoles, and indazoles, such that said coating has residues of said one or more compounds as measured by a ToF-SIMS technique, said elongated steel element having a roughness $R_a$ ranging from 0.10 µm to 2.0 µm, and said elongated steel element being configured to reinforce tire rubber products.

20. The process as claimed in claim 19, wherein said aqueous lubricant further contains a mineral oil.

21. The process as claimed in claim 19, wherein said aqueous lubricant further contains a vegetable oil.

22. A process as claimed in claim 19, wherein the process further comprises the step of twisting two or more drawn elongated steel elements.

* * * * *